United States Patent
Miyake (10) Patent No.: US 10,411,588 B2
(45) Date of Patent: Sep. 10, 2019

(54) POWER CONVERTER WITH TRENCH AND PLANAR TRANSISTORS TO IMPROVE EFFICIENCY

(71) Applicant: TOYOTA JIDOSHA KABUSHIKI KAISHA, Toyota-shi, Aichi-ken (JP)

(72) Inventor: Hiroki Miyake, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 16/131,866

(22) Filed: Sep. 14, 2018

(65) Prior Publication Data
US 2019/0103806 A1  Apr. 4, 2019

(30) Foreign Application Priority Data

Sep. 29, 2017 (JP) .................................. 2017-191200

(51) Int. Cl.
*H02M 3/158* (2006.01)
*H02M 1/32* (2007.01)
(Continued)

(52) U.S. Cl.
CPC ............... *H02M 1/32* (2013.01); *H02J 1/102* (2013.01); *H02M 1/08* (2013.01); *H02M 3/155* (2013.01);
(Continued)

(58) Field of Classification Search
CPC . H02M 2001/0048; H02M 2003/1586; H02M 2001/0054
See application file for complete search history.

(56) References Cited

U.S. PATENT DOCUMENTS

2006/0279350 A1* 12/2006 Zhang ........................ G06F 1/26
327/407
2008/0252372 A1* 10/2008 Williams .............. H01L 27/092
330/251

(Continued)

FOREIGN PATENT DOCUMENTS

JP          H08182342 A        7/1996
JP          H09121595 A        5/1997
(Continued)

OTHER PUBLICATIONS

B. Jayant Baliga, "Fundamentals of Power Semiconductor Devices", Springer, 2008(pp. 279-280, pp. 284-286, pp. 327-340, pp. 358-366, pp. 371-372, pp. 389-390, pp. 399-400, pp. 421-422), 41 pages.

*Primary Examiner* — Harry R Behm
(74) *Attorney, Agent, or Firm* — Hunton Andrews Kurth LLP (57) ABSTRACT

A power converter includes one or more first conversion circuits, one or more second conversion circuits, and a controller. The first conversion circuit is configured to use a trench type transistor. The second conversion circuit is configured to use a planar type transistor. All the one or more first conversion circuits and all the one or more second conversion circuits are connected in parallel to each other or connected in series to each other. The controller stops all the one or more second conversion circuits and operates at least one of the one or more first conversion circuits while an output command value is lower than a predetermined output threshold value. The controller operates all the one or more first conversion circuits and operates at least one of the one or more second conversion circuits when the output command value exceeds the predetermined output threshold value.

5 Claims, 5 Drawing Sheets

(51) Int. Cl.

| | | |
|---|---|---|
| *H02M 7/5395* | (2006.01) | |
| *H02M 1/08* | (2006.01) | |
| *H02M 3/155* | (2006.01) | |
| *H02J 1/10* | (2006.01) | |
| H02P 27/08 | (2006.01) | |
| H02M 1/00 | (2006.01) | |
| H02M 7/48 | (2007.01) | |

(52) U.S. Cl.
CPC ....... *H02M 3/1584* (2013.01); *H02M 7/5395* (2013.01); *H02M 7/48* (2013.01); *H02M 2001/007* (2013.01); *H02M 2001/0048* (2013.01); *H02M 2001/0054* (2013.01); *H02M 2001/0077* (2013.01); *H02M 2001/327* (2013.01); *H02M 2003/1586* (2013.01); *H02P 27/08* (2013.01)

(56) References Cited

U.S. PATENT DOCUMENTS

| | | |
|---|---|---|
| 2010/0207598 A1 | 8/2010 | Hamatani |
| 2011/0316514 A1 | 12/2011 | Deboy |
| 2016/0116345 A1* | 4/2016 | Furtner .................... G01K 7/01 374/178 |

FOREIGN PATENT DOCUMENTS

| | | |
|---|---|---|
| JP | 2012109580 A | 6/2012 |
| KR | 20100035713 A | 4/2010 |
| KR | 20130067440 A | 6/2013 |
| WO | 2005/065385 A2 | 7/2005 |

\* cited by examiner

POWER CONVERTER WITH TRENCH AND PLANAR TRANSISTORS TO IMPROVE EFFICIENCY

INCORPORATION BY REFERENCE

The disclosure of Japanese Patent Application No. 2017-191200 filed on Sep. 29, 2017 including the specification, drawings and abstract is incorporated herein by reference in its entirety.

BACKGROUND

1. Technical Field

The present disclosure relates to a power converter. In particular, the present disclosure relates to a power converter using switching elements having different characteristics.

2. Description of Related Art

A power converter using switching elements having different characteristics as switching elements for power conversion is known. Japanese Unexamined Patent Application Publication No. 08-182342 (JP 08-182342 A) discloses an example of the above-described power converter. The power converter disclosed in JP 08-182342 A is a device that outputs a pulse signal of three levels. In the power converter, a first conversion circuit for generating a long period pulse signal and a second conversion circuit for generating a short period pulse signal are connected in parallel to each other. The output of the power converter is obtained by superimposing the output signal of the first conversion circuit and the output signal of the second conversion circuit. A gate turn-off thyristor (so-called GTO) is used as the first conversion circuit for generating a long period pulse signal. An insulated gate bipolar transistor (so-called IGBT) is used as the second conversion circuit for generating a short period pulse signal. Compared with the IGBT, the GTO has a small on-resistance (steady loss) but a large switching loss. In contrast, compared with the GTO, the IGBT has a small switching loss but a large on-resistance. In the power converter disclosed in JP 08-182342 A, the GTO is adopted as the first conversion circuit for generating a long period pulse signal having a relatively small number of switching times, and the IGBT is adopted as the second conversion circuit for generating a short period pulse signal having a relatively large number of switching times, thereby suppressing the loss of the entire converter.

SUMMARY

The power converter disclosed in JP 08-182342 A needs two types of elements called a thyristor and a transistor having largely different structures. Therefore, the development cost increases. In the power converter disclosed in JP 08-182342 A, switching elements are selectively used at the frequency of the output pulse signal. Therefore, the power converter disclosed in JP 08-182342 A cannot be applied as a power converter capable of changing the magnitude of the output. The present disclosure relates to a power converter capable of changing the magnitude of an output, and provides a power converter that makes it possible to further suppress development cost and further suppress the loss of the entire converter.

An aspect of the present disclosure relates to a power converter including one or more first conversion circuits, one or more second conversion circuits, and a controller. The first conversion circuit is configured to use a trench type transistor as a switching element for power conversion. The second conversion circuit is configured to use a planar type transistor as a switching element for power conversion. All the one or more first conversion circuits and all the one or more second conversion circuits are connected in parallel to each other, or all the one or more first conversion circuits and all the one or more second conversion circuits are connected in series to each other. The controller is configured to select a conversion circuit to be operated according to an output command value for the power converter (hereinafter, simply referred to as an output command value). The controller is configured to stop all the one or more second conversion circuits and operate at least one of the one or more first conversion circuits while the output command value is lower than a predetermined output threshold value. The controller is configured to operate all the one or more first conversion circuits and operate at least one of the one or more second conversion circuits in a case where the output command value exceeds the predetermined output threshold value.

The trench type transistor has a smaller on-resistance (steady loss) than the planar type transistor. Conversely, the planar type transistor has a smaller switching loss than the trench type transistor. Therefore, in the power converter according to the aspect of the present disclosure, in a case where the output command value is smaller than the predetermined output threshold value, solely the first conversion circuit adopting the trench type transistor having a relatively small on-resistance (steady loss) is used. In a fuel consumption region where the output command value is smaller than the predetermined output threshold value, the influence of the switching loss on the heat generation amount of the transistor is smaller than the influence of the on-resistance (steady loss) on the heat generation amount of the transistor. In a high load region where the output command value is larger than the predetermined output threshold value, the influence of the switching loss on the heat generation amount of the transistor is larger than the influence of the on-resistance (steady loss) on the heat generation amount of the transistor. However, in the range where the output command value is smaller than the predetermined output threshold value, even in a case where a small number of power conversion circuits operate to generate heat, the cooler can intensively cool the first conversion circuit including the transistor having a relatively large heat generation amount as long as the heat generation amount of the entire power converter is relatively small. In the range where the output command value is smaller than the predetermined output threshold value, the loss of the entire device can be suppressed by preferentially using the first conversion circuit adopting the trench type transistor having a relatively small on-resistance (steady loss).

On the other hand, in a case where the output command value increases, a plurality of conversion circuits, that is, a plurality of transistors needs to be operated. In this case, the heat generation amount of all of the transistors becomes a problem. Therefore, a planar type transistor having a relatively small switching loss is adopted as a conversion circuit to be operated in a case where the output command value is larger than the predetermined output threshold value. In this manner, since the heat generation amount of all the transistors is suppressed, the loss of the entire device is suppressed.

Using a different type of transistor according to the output command value is particularly suitable for a power converter of an electric vehicle in which a frequency at which a low output is needed is higher than a frequency at which a high output is needed (power converter for converting the output power of a direct current power supply into the drive electric power of a motor for traveling).

The structure difference between the trench type transistor and the planar type transistor is not as large as that between the GTO and the IGBT. Therefore, it is possible to suppress the cost of simultaneously developing two types of switching elements. The trench type transistor and the planar type transistor may be IGBTs or metal oxide semiconductor field effect transistors (MOSFETs).

In the power converter according to the aspect of the present disclosure, the controller may be configured to set a carrier frequency of a case where all the one or more first conversion circuits and all the one or more second conversion circuits are operated to be higher than a carrier frequency of a case where the second conversion circuit is not operated.

The power converter according to the aspect of the present disclosure may further include a reactor for power conversion and a temperature sensor configured to monitor a temperature of the reactor. In a case where the temperature of the reactor exceeds a predetermined first temperature threshold value, the controller may be configured to set a carrier frequency to be higher than a carrier frequency before exceeding the first temperature threshold value.

The power converter according to the aspect of the present disclosure may further include a capacitor and a temperature sensor configured to monitor a temperature of the capacitor. In a case where the temperature of the capacitor exceeds a predetermined first temperature threshold value, the controller may be configured to set a carrier frequency to be higher than a carrier frequency before exceeding the first temperature threshold value.

In a case where the carrier frequency increases, it is possible to suppress the amplitude of the alternating current component of the current flowing through the reactor or the capacitor. Therefore, overheating of the reactor or the capacitor can be prevented. The power converter according to the present disclosure increases the carrier frequency in a case where all the one or more second conversion circuits adopting the planar type transistor having a relatively small switching loss are operating. Therefore, even in a case where the heat generation amount of the reactor or the capacitor is relatively large, it is possible to suppress the loss of the entire power converter.

In the power converter according to the aspect of the present disclosure, in a case where a temperature of the transistor of any one of all the one or more first conversion circuits and all the one or more second conversion circuits exceeds a predetermined second temperature threshold value, the controller may be configured to set a carrier frequency to be lower than a carrier frequency before exceeding the second temperature threshold value. In a case where the carrier frequency increases, overheating of the reactor or the capacitor can be suppressed, while the heat generation amount of the transistor increases (in a case where a plurality of planar type transistors and a plurality of trench type transistors are operating even though the switching loss of the planar type transistor is relatively small, the heat generation amount of the entire transistor increases). Therefore, in a case where the temperature of the transistor exceeds the predetermined second temperature threshold value, the carrier frequency may be lowered again in order to protect the transistor.

Since suppressing the loss of the entire device results in suppressing the heat generation amount of the entire device, the load on the cooler is reduced. Therefore, in the above structure, the effect of reducing the size of the entire power conversion system including the cooler can be obtained. Details and further improvements of the present disclosure will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
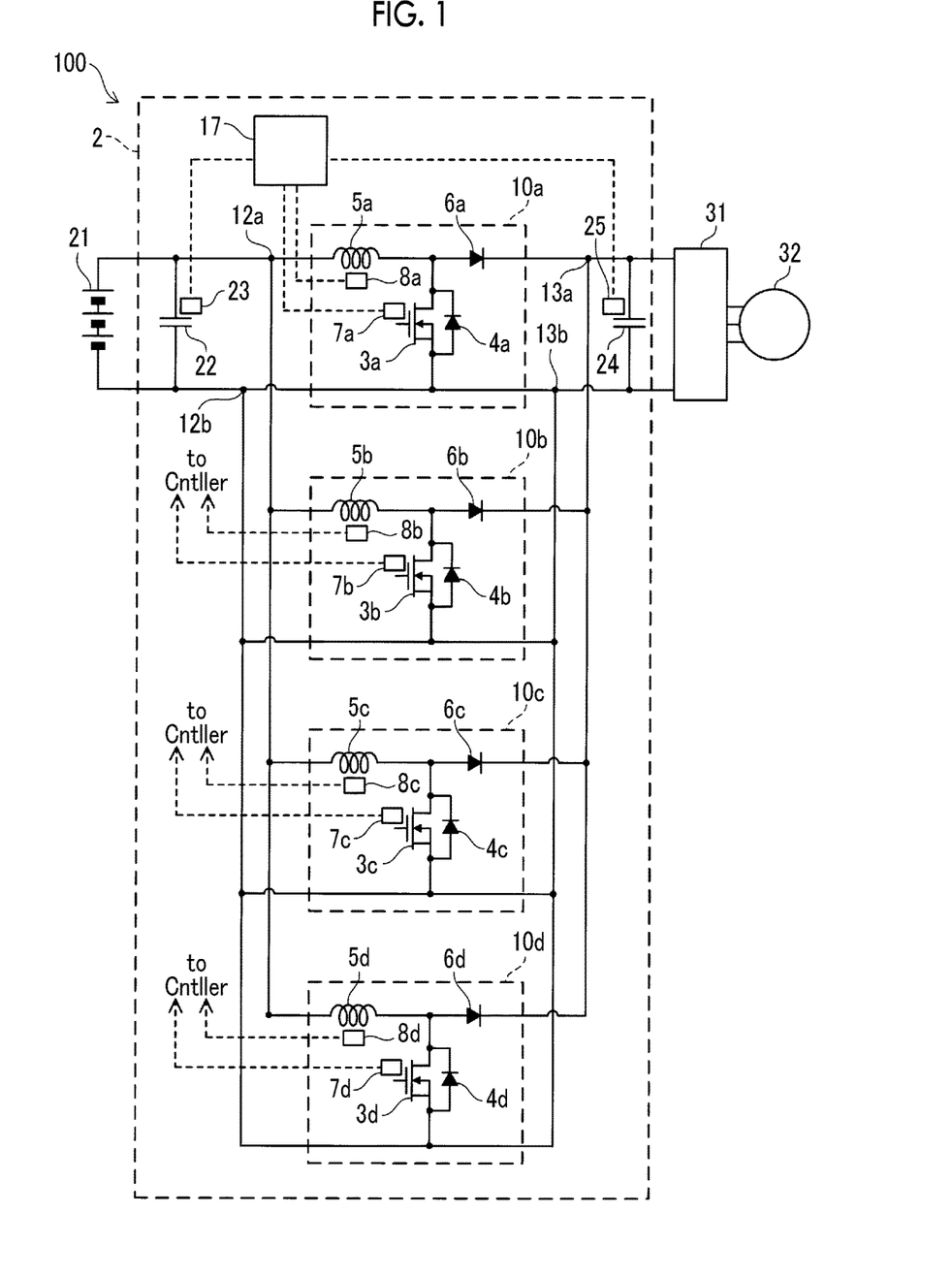
FIG. 1 is a block diagram of a power system of an electric vehicle including a power converter of a first embodiment.

A power converter of a first embodiment will be described with reference to the diagrams. A power converter 2 of the first embodiment is mounted in an electric vehicle 100. FIG. 1 shows a block diagram of an electric power system of the electric vehicle 100. The electric vehicle 100 includes a direct current power supply 21, the power converter 2, an inverter 31, and a traveling motor 32. The power converter 2 is a device that boosts the output voltage of the direct current power supply 21 and supplies the boosted output voltage to the inverter 31. The inverter 31 converts the direct current power (DC power) boosted by the power converter 2 into alternating current power suitable for driving the traveling motor 32. That is, the power converter 2 is a device that operates together with the inverter 31 and converts the power of the direct current power supply 21 into the drive electric power of the traveling motor 32. The direct current power supply 21 is a secondary battery, such as a lithium ion battery. The direct current power supply 21 may be a fuel cell.

The power converter 2 includes four power conversion circuits 10a to 10d, capacitors 22, 24, and a controller 17.

The four power conversion circuits 10a to 10d are connected in parallel to each other between common input terminals 12a, 12b and common output terminals 13a, 13b. All of the four power conversion circuits 10a to 10d are boost converters that boost and output the voltage of input power. The power conversion circuits 10a, 10b have the same structure. The power conversion circuits 10c, 10d have the same structure as the power conversion circuit 10a except for the type of switching element being used.

The capacitor 22 is connected between the common input terminals 12a, 12b. The capacitor 24 is connected between the common output terminals 13a, 13b. The capacitor 22 smoothes a current input to the power conversion circuits 10a to 10d. The capacitor 24 smoothes a current output from the power conversion circuits 10a to 10d. The capacitor 22 includes a temperature sensor 23. The capacitor 24 includes a temperature sensor 25. The measurement values of the temperature sensors 23, 25 are transmitted to a controller 17.

The power conversion circuit 10a will be described. The power conversion circuit 10a includes a switching element 3a, a diode 4a, a reactor 5a, a diode 6a, and two temperature sensors 7a, 8a. One end of the reactor 5a is connected to an input terminal positive electrode 12a, and the other end of the reactor 5a is connected to the anode of the diode 6a. The cathode of the diode 6a is connected to an output terminal positive electrode 13a.

An input terminal negative electrode 12b and an output terminal negative electrode 13b of the power conversion circuit 10a are directly connected to each other. The switching element 3a is connected between the intermediate point between the reactor 5a and the diode 6a and the input terminal negative electrode 12b (output terminal negative electrode 13b). The diode 4a is connected in anti-parallel to the switching element 3a.

The switching element 3a is controlled by the controller 17. In a case where the switching element 3a is turned on and off at a predetermined duty ratio, the voltage of the power of the direct current power supply 21 applied to the input terminals 12a, 12b is boosted and output from the output terminals 13a, 13b. Since the circuit and operation of the power conversion circuit 10a shown in FIG. 1 are well known, the detailed description thereof will be omitted.

The temperature sensor 7a is disposed in the vicinity of the switching element 3a. The temperature sensor 8a is disposed in the vicinity of the reactor 5a. The temperature sensor 7a measures the temperature of the switching element 3a. The temperature sensor 8a measures the temperature of reactor 5a. The measurement values of the temperature sensors 7a, 8a are transmitted to the controller 17.

The power conversion circuit 10b includes a switching element 3b, a diode 4b, a reactor 5b, a diode 6b, and two temperature sensors 7b, 8b. The structure of the power conversion circuit 10b is the same as the structure of the power conversion circuit 10a. The measurement values of the temperature sensors 7b, 8b are transmitted to the controller 17. "toCntller" at the end of the broken line extending from the temperature sensors 7b, 8b is the abbreviation for "to Controller (to controller 17)".

Both the switching element 3a of the power conversion circuit 10a and the switching element 3b of the power conversion circuit 10b are trench type metal oxide semiconductor field effect transistor (MOSFET).

The power conversion circuits 10c, 10d also have the same structure as the power conversion circuit 10a. The sole difference between the power conversion circuits 10c, 10d and the power conversion circuit 10a is that the switching elements 3c, 3d of the power conversion circuits 10c, 10d are not trench type and are planar type MOSFETs.

Figure 2:
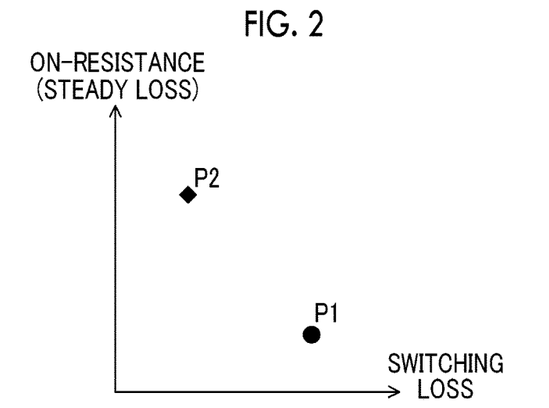
FIG. 2 is a graph illustrating a difference between the characteristics of a trench type transistor and a planar type transistor.

The difference between the trench type transistor and the planar type transistor will be briefly described. FIG. 2 shows a graph illustrating the difference between the characteristics of the trench type transistor and the planar type transistor. In the graph of FIG. 2, the horizontal axis indicates the magnitude of the switching loss and the vertical axis indicates the magnitude of the on-resistance (steady loss). In the lower right region of the graph, the on-resistance (steady loss) is smaller than the switching loss. In the upper left region of the graph, the switching loss is smaller than the on-resistance (steady loss).

A point P1 indicates the characteristics of the trench type transistor, and a point P2 indicates the characteristics of the planar type transistor. The characteristics (point P1) of the trench type transistor belong to the lower right region of the graph of FIG. 2, and the characteristics (point P2) of the planar type transistor belong to the upper left region of the graph. That is, the trench type transistor has a feature that the on-resistance (steady loss) is smaller than that of the planar type transistor, and the planar type transistor has a feature that the switching loss is smaller than that of the trench type transistor.

The trench type MOSFET has no junction field-effect transistor (JFET) resistance compared with the planar type MOSFET. Accordingly, it is possible to shorten the pitch. In principle, the trench type MOSFET has a relatively small on-resistance (steady loss), but its capacitance is relatively large. In addition, the manufacturing cost of the trench type MOSFET is relatively high due to the necessity of a trench structure and technical difficulties. Meanwhile, the manufacturing cost of the planar type MOSFET is relatively low since trenches do not need to be formed. In principle, the planar type MOSFET has a smaller capacity than the trench type MOSFET, so that the switching loss is relatively small. This is suitable for increasing the carrier frequency. Since the switching loss is relatively small, a cooler for cooling the transistor can be made relatively small. Therefore, the system cost can be further suppressed.

Differences between the trench type and the planar type are described in, for example, the document (Fundamentals of Power Semiconductor Devices, B. Jayant Baliga, Springer, 2008).

The controller 17 of the power converter 2 selects a power conversion circuit to be operated among the power conversion circuits 10a to 10d according to the magnitude of the output current command value transmitted from a host controller (not shown). For convenience of description, the power conversion circuit 10a is referred to as a first phase conversion circuit 10a, the power conversion circuit 10b is referred to as a second phase conversion circuit 10b, the power conversion circuit 10c is referred to as a third phase conversion circuit 10c, and the power conversion circuit 10d is referred to as a fourth phase conversion circuit 10d. As the output current command value increases, the controller 17 increases the number of conversion circuits to be operated in order of the first phase to the fourth phase.

In a case where the output current command value for the power converter 2 is lower than a predetermined output threshold value, the controller 17 stops the third phase conversion circuit 10c and the fourth phase conversion circuit 10d, and determines whether to operate solely the first phase conversion circuit 10a or to operate both the first phase conversion circuit 10a and the second phase conversion circuit 10b according to the magnitude of the output current command value. That is, while the output current command value is relatively small, the controller 17 preferentially uses a power conversion circuit including a trench type transistor (the first phase conversion circuit 10a and the second phase conversion circuit 10b).

As described above, the output current command value is transmitted from the host controller (not shown) to the controller 17. The host controller determines electric power (target power), which is to be output from the traveling motor 32, from the accelerator operation amount, the vehicle speed, the remaining amount of the direct current power supply 21, and the like. The host controller determines a current value (output current command value), which is to be output from the power converter 2, from the voltage of the direct current power supply 21 and the target power, and gives an instruction to the controller 17. The controller 17 selects a power conversion circuit to be operated according to the magnitude of the output current command value, and supplies a driving signal of a predetermined duty ratio to the switching element of the selected power conversion circuit.

Figure 3:
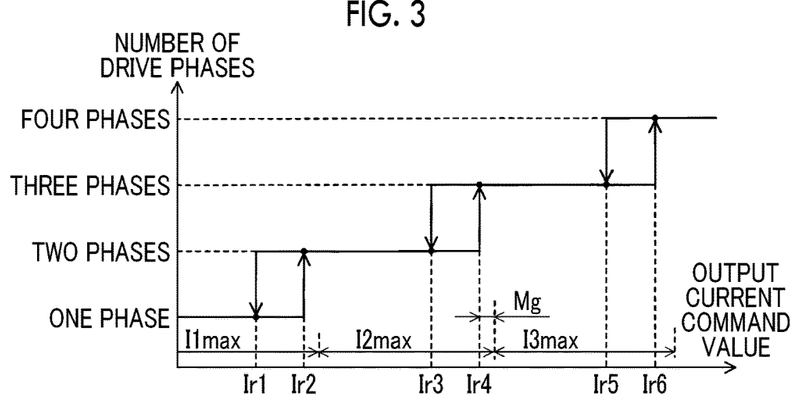
FIG. 3 is a graph illustrating the switching control of the number of drive phases.

FIG. 3 is a graph illustrating the switching control of the number of drive phases. In the graph of FIG. 3, the horizontal axis indicates the output current command value, and the vertical axis indicates the number of conversion circuits to be driven. "One phase" on the vertical axis in FIG. 3 means driving solely the first phase conversion circuit 10*a*. "Two phases" on the vertical axis means that the third phase conversion circuit 10*c* and the fourth phase conversion circuit 10*d* are stopped and the first phase conversion circuit 10*a* and the second phase conversion circuit 10*b* are driven. "Three phases" on the vertical axis means that the fourth phase conversion circuit 10*d* is stopped and the first phase conversion circuit 10*a* to the third phase conversion circuit 10*c* are driven.

While the output current command value is lower than a current Ir4, the controller 17 stops the third phase conversion circuit 10*c* and the fourth phase conversion circuit 10*d*, and determines whether to operate solely the first phase conversion circuit 10*a* or to operate both the first phase conversion circuit 10*a* and the second phase conversion circuit 10*b* according to the magnitude of the output current command value. In a case where the output current command value exceeds the current Ir4, the controller 17 determines, in addition to the first phase conversion circuit 10*a* and the second phase conversion circuit 10*b*, whether to operate the third phase conversion circuit 10*c* or to operate the third phase conversion circuit 10*c* and the fourth phase conversion circuit 10*d* according to the magnitude of the output current command value.

Specifically, in a case where the output current command value is lower than a current Ir2, the controller 17 drives solely the first phase conversion circuit 10*a*. The controller 17 supplies a driving signal of a predetermined duty ratio to the switching element 3*a* of the first phase conversion circuit 10*a* so that the output of the power converter 2 matches the output current command value.

In a case where the output current command value exceeds the current Ir2, the controller 17 drives the second phase conversion circuit 10*b* in addition to the first phase conversion circuit 10*a*. The controller 17 supplies a driving signal of a predetermined duty ratio to each of the switching elements 3*a*, 3*b* of the first phase conversion circuit 10*a* and the second phase conversion circuit 10*b* so that the total output of the first phase conversion circuit 10*a* and the second phase conversion circuit 10*b* matches the output current command value. In FIG. 3, I1max indicates the maximum output current of the first phase conversion circuit 10*a*, and I2max indicates the maximum output current of the second phase conversion circuit 10*b*.

As described above, while the output current command value is lower than the current Ir4, the controller 17 stops the third phase conversion circuit 10*c* and the fourth phase conversion circuit 10*d* adopting planar type transistors, and realizes the output current command value solely with the first phase conversion circuit 10*a* and the second phase conversion circuit 10*b* adopting trench type transistors.

The current Ir4 used in determining whether or not to operate the third phase conversion circuit 10*c* corresponds to the above-described output threshold value. The output threshold value is set to a value obtained by subtracting a small margin Mg from the total maximum output current (I1max+I2max) of the first phase conversion circuit 10*a* and the second phase conversion circuit 10*b* adopting trench type transistors. The current Ir4 corresponding to the output threshold value is set to a value larger than the maximum output current I1max of the first phase conversion circuit 10*a*.

In a case where the output current command value exceeds the current Ir4, the controller 17 operates the planar type third phase conversion circuit 10*c* in addition to the trench type first phase conversion circuit 10*a* and the trench type second phase conversion circuit 10*b* to realize the output current command value. In a case where the output current command value exceeds a current Ir6, the controller 17 operates all the power conversion circuits 10*a* to 10*d*. I3max indicates the maximum output current of the third phase conversion circuit 10*c*. The controller 17 operates all the power conversion circuits 10*a* to 10*d* in a case where the output current command value exceeds a total maximum output current (I1max+I2max+I3max) of the first phase conversion circuit 10*a* to the third phase conversion circuit 10*c*. In practice, the current Ir6 obtained by subtracting the margin Mg from the total maximum output current of the first phase conversion circuit 10*a* to the third phase conversion circuit 10*c* also becomes a threshold value at which the operation of the fourth phase conversion circuit 10*d* starts.

After the output current command value exceeds the current Ir6 and all the power conversion circuits 10*a* to 10*d* start to operate, the controller 17 stops the fourth phase conversion circuit 10*d* in a case where the output current command value becomes lower than a current Ir5 (<Ir6). While the first phase conversion circuit 10*a* to the third phase conversion circuit 10*c* are operating, the controller 17 stops the third phase conversion circuit 10*c* in a case where the output current command value becomes lower than a current Ir3 (<current Ir4). While the first phase conversion circuit 10*a* and the second phase conversion circuit 10*b* are operating, the controller 17 stops the second phase conversion circuit 10*b* in a case where the output current command value is lower than a current Ir1 (<current Ir2).

The reason why the threshold values Ir1, Ir3, Ir5 in the case of reducing the number of drive phases are slightly smaller than the threshold values Ir2, Ir4, Ir6 in the case of increasing the number of drive phases is to prevent hunting that the number of drive phases is frequently switched.

In a case where the number of phases to be operated is three or less, the carrier frequency at the time of determining the pulse width modulation (PWM) signal that is a driving command value for the switching elements 3*a* to 3*c* is fa. In a case where the controller 17 starts to operate all the phases, the carrier frequency increases from fa to fc. The power converter 2 includes a cooler (not shown). This is to suppress heat generation of the reactors 5*a* to 5*d* provided in the power conversion circuits 10*a* to 10*d* since the capacity of the cooler becomes insufficient in a case where all the power conversion circuits 10*a* to 10*d* operate.

The power converter 2 uses solely the first phase conversion circuit 10*a* and the second phase conversion circuit 10*b* adopting trench type transistors (switching elements 3*a*, 3*b*) while the output current command value is relatively small. In a case where the output current command value increases, the power converter 2 uses the third phase conversion circuit 10c and the fourth phase conversion circuit 10d adopting planar type transistors (switching elements 3c, 3d) in addition to the first phase conversion circuit 10a and the second phase conversion circuit 10b. The advantages of the above content will be described. Although not shown, the power converter 2 includes a cooler for cooling the switching elements 3a to 3d and the reactors 5a to 5d of the respective power conversion circuits. The cooler also cools the capacitors 22, 24 (refer to FIG. 1).

As described above, the on-resistance (steady loss) of the trench type transistor is lower than that of the planar type transistor. In particular, the on-resistance (steady loss) has an influence on the heat generation amount of the device. That is, the heat generation amount of the trench type transistor is smaller than that of the planar type transistor. While the third phase conversion circuit 10c and the fourth phase conversion circuit 10d are stopped, the total heat generation amount of the power converter 2 is relatively small. Therefore, even in a case where the heat generation amount of the switching elements 3a, 3b (trench type transistors) of the first phase conversion circuit 10a and the second phase conversion circuit 10b is relatively large, the cooler can intensively cool the switching elements 3a, 3b. On the other hand, since the on-resistance (steady loss) of the trench type transistor is relatively small, the total loss of the power converter 2 is kept relatively low while solely the first phase conversion circuit 10a and the second phase conversion circuit 10b are operating.

On the other hand, in a case where the output current command value increases, the output current command value cannot be realized unless the third phase conversion circuit 10c and the fourth phase conversion circuit 10d are used in addition to the first phase conversion circuit 10a and the second phase conversion circuit 10b. In a case where the output current command value increases, the total heat generation amount of the power converter 2 also increases. Here, the switching elements 3c, 3d adopted in the third phase conversion circuit 10c and the fourth phase conversion circuit 10d are planar type transistors, and the switching loss having a large influence on the heat generation amount in a high load region is relatively small. For this reason, since an increase in the heat generation amount in a case where the third phase conversion circuit 10c and the fourth phase conversion circuit 10d are operated is suppressed, the cooler can continue to cool the entire power converter 2. By suppressing the temperature rise of the power converter 2, the loss of the entire power converter 2 can also be suppressed.

The structure of the trench type MOSFET and the structure of the planar type MOSFET are not largely different. There is an advantage that the cost of simultaneously developing both the MOSFETs is relatively low.

Figure 4:
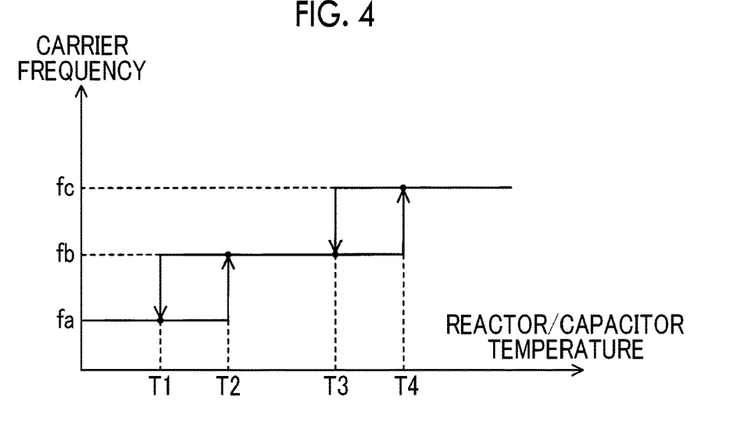
FIG. 4 is a graph illustrating a first example of the switching control of a carrier frequency.

Description will return to the switching control of the number of drive phases executed by the controller 17. In addition to the switching control of the number of drive phases shown in FIG. 3, the controller 17 switches the carrier frequency according to the temperatures of the reactors 5a to 5d and the capacitors 22, 24. The power conversion circuits 10a to 10d have the temperature sensors 8a to 8d for measuring the temperatures of the reactors 5a to 5d, respectively, and the measurement values of the temperature sensors 8a to 8d are transmitted to the controller 17. The power converter 2 includes the temperature sensor 23 for measuring the temperature of the capacitor 22 and the temperature sensor 25 for measuring the temperature of the capacitor 24, and the measurement values of the temperature sensors 23, 25 are transmitted to the controller 17. The controller 17 increases the carrier frequency in a case where the temperature of any one of the reactors 5a to 5d and the capacitors 22, 24 exceeds a threshold value. FIG. 4 is a graph illustrating the switching control of the carrier frequency according to the temperature of the reactor/capacitor.

The initial value of the carrier frequency of each of the switching elements 3a to 3d is fa. The controller 17 increases the carrier frequency to fb in a case where the temperature of any one of the reactors 5a to 5d and the capacitors 22, 24 exceeds the temperature T2. The controller 17 increases the carrier frequency to fc in a case where the temperature of any one of the reactors 5a to 5d and the capacitors 22, 24 exceeds the temperature T4. The higher the carrier frequency, the smaller the amplitude of the alternating current component of the current flowing through the reactors 5a to 5d and the capacitors 22, 24, thereby suppressing heat generation. The relationship among the frequencies fa, fb, fc is fc>fb>fa. The frequency fa is not particularly limited, and is preferably 10 [kHz].

In a case where the highest temperature among the temperatures of components becomes lower than the temperature T3 after the temperature of any one of the reactors 5a to 5d and the capacitors 22, 24 exceeds the temperature T4 and the carrier frequency is changed to fc, the controller 17 lowers the carrier frequency to fb. In a case where the highest temperature among the temperatures of the reactors 5a to 5d and the capacitors 22, 24 becomes lower than the temperature T1 while the carrier frequency is fb, the controller 17 lowers the carrier frequency to fa. The reason why the threshold values T2, T4 in the case of increasing the carrier frequency is slightly lower than the threshold values T1, T3 in the case of lowering the carrier frequency is to prevent hunting that the carrier frequency is frequently switched. The switching control described above is as follows. The power converter 2 includes the capacitors 22, 24 and the reactors 5a to 5d for power conversion. In a case where the temperatures of the reactors 5a to 5d or the temperatures of the capacitors 22, 24 exceed the first temperature threshold values T2, T4, the controller 17 makes the carrier frequency higher than the carrier frequency before exceeding the first temperature threshold value.

Figure 5:
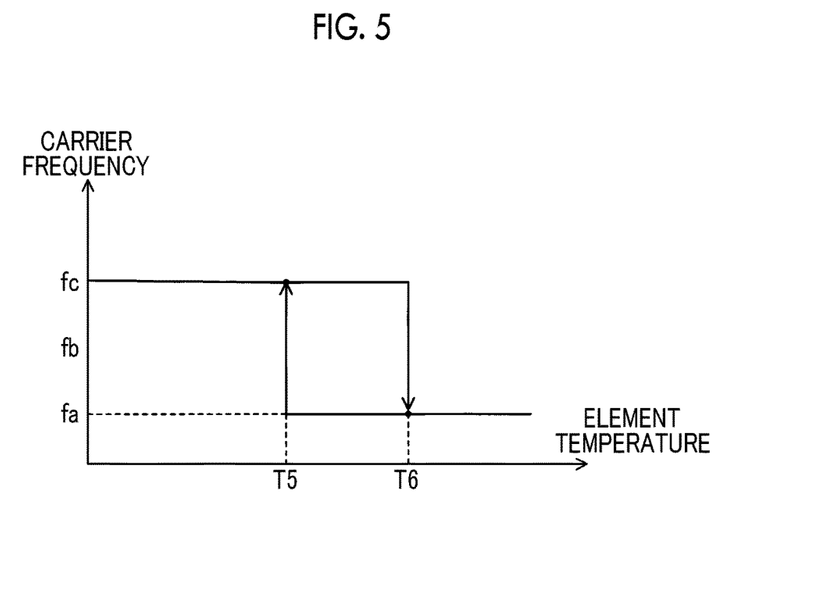
FIG. 5 is a graph illustrating a second example of the switching control of a carrier frequency.

The controller 17 also changes the carrier frequency according to the temperatures of the switching elements 3a to 3d. FIG. 5 is a graph illustrating the switching control of the carrier frequency according to the temperature of the switching element. In FIG. 5, the horizontal axis indicates the temperature of the switching element and the vertical axis indicates the carrier frequency. Temperature T5 in FIG. 5 is a temperature higher than the temperature T4 in FIG. 4. The temperatures of the switching elements 3a to 3d are measured by the temperature sensors 7a to 7d, respectively, and the measurement data is transmitted to the controller 17 (refer to FIG. 1).

As described above, the controller 17 increases the carrier frequency to fc [kHz] in a case where the temperature of any one of the reactors 5a to 5d and the capacitors 22, 24 exceeds the temperature T4. As the carrier frequency increases, the number of switching times of the switching element increases, and the heat generation amount of the switching element increases. The controller 17 lowers the carrier frequency from fc to fa in a case where the temperature of any one of the switching elements 3a to 3d exceeds the temperature T6 (>T4). That is, in a case where the temperature of any one of the switching elements 3a to 3d of the power conversion circuits 10a to 10d exceeds the predetermined second temperature threshold value T6, the controller 17 makes the carrier frequency lower than the carrier frequency before exceeding the second temperature threshold value. This is because preventing the overheating of the switching element is more significant than preventing the overheating of the reactor or the capacitor in the control described above.

In a case where the temperature of the switching element becomes lower than the temperature T5, the controller 17 increases the carrier frequency to fc again. The reason why the threshold value (temperature T5) in the case of increasing the carrier frequency is slightly lower than the threshold value (temperature T6) in the case of lowering the carrier frequency is to prevent hunting that the carrier frequency is frequently switched.

Figure 6:
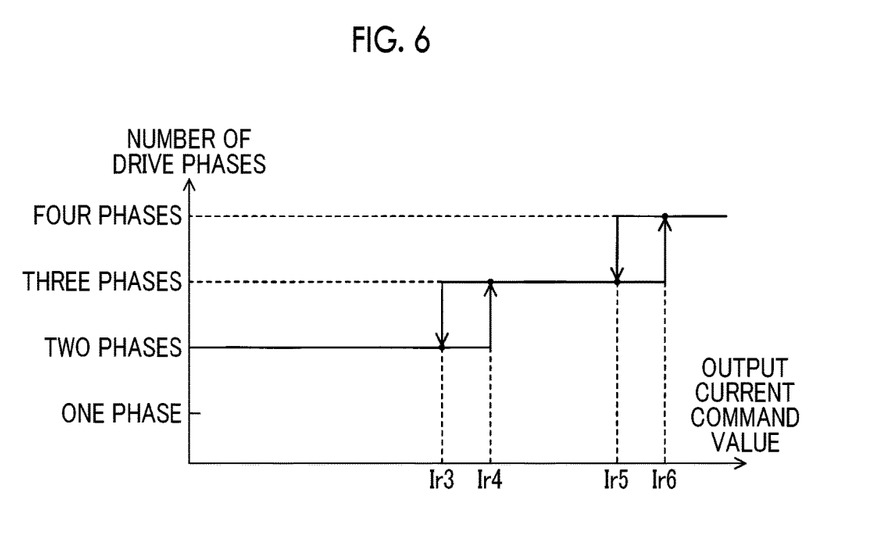
FIG. 6 is a graph illustrating the switching control of the number of drive phases in a modification example.

FIG. 6 shows a modification example of the switching control of the number of drive phases according to the output current command value. In the switching control shown in FIG. 6, while the output current command value is lower than the current Ir4 (output threshold value), the controller 17 stops the third phase conversion circuit 10c and the fourth phase conversion circuit 10d and operates both the first phase conversion circuit 10a and the second phase conversion circuit 10b. In a case where the output current command value exceeds the current Ir4, the controller 17 operates the third phase conversion circuit 10c in addition to the first phase conversion circuit 10a and the second phase conversion circuit 10b. In a case where the output current command value exceeds the current Ir6, the controller 17 operates all the power conversion circuits 10a to 10d. As described above, in a case where the output current command value is lower than the current Ir4 (output threshold value), the first phase conversion circuit 10a and the second phase conversion circuit 10b, that is, all the power conversion circuits adopting trench type transistors may be operated.

Also in the example shown in FIG. 6, the reason why the threshold values Ir3, Ir5 in the case of reducing the number of drive phases are slightly smaller than the threshold values Ir4, Ir6 in the case of increasing the number of drive phases is to prevent hunting that the number of drive phases is frequently switched.

Second Embodiment

Figure 7:
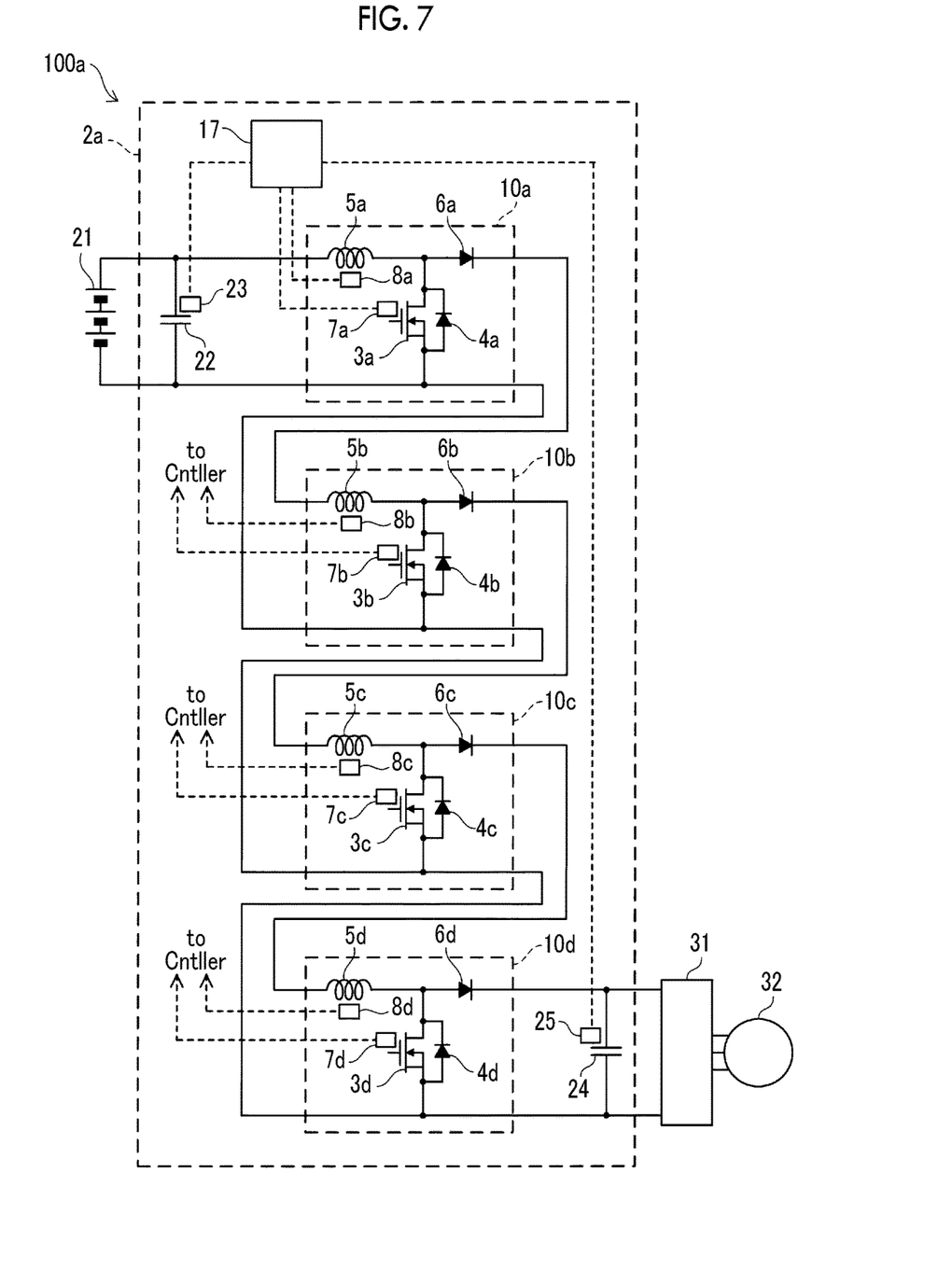
FIG. 7 is a block diagram of a power system of an electric vehicle including a power converter of a second embodiment.

A power converter 2a of a second embodiment will be described with reference to FIGS. 7 and 8. The power converter 2a of the second embodiment is mounted in an electric vehicle 100a. FIG. 7 is a block diagram showing the electric vehicle 100a including the power converter 2a. Since the electric vehicle 100a is the same as the electric vehicle 100 of the first embodiment except for the inside of the power converter 2a, the description thereof will be omitted.

The power converter 2a of the second embodiment includes four power conversion circuits 10a to 10d, capacitors 22, 24, and a controller 17. The configuration of each of the power conversion circuits 10a to 10d is the same as that of the power conversion circuit in the first embodiment. The power converter 2a of the second embodiment is different from the power converter 2 of the first embodiment in that the four power conversion circuits 10a to 10d are connected in series to each other. Each of the four power conversion circuits 10a to 10d is a boost converter. The output voltage of the power converter 2a is a value obtained by multiplying the voltage of the direct current power supply 21 as an input by the boost ratio of a power conversion circuit (boost converter) to be operated.

The controller 17 of the power converter 2a receives a command (output voltage command value) of a voltage, which is to be output from the power converter 2a, from a host controller (not shown). The controller 17 determines the number of power conversion circuits to be operated according to the magnitude of the output voltage command value for the power converter 2a. FIG. 8 shows a graph illustrating the switching control of the number of drive phases of the power conversion circuit. In FIG. 8, the horizontal axis indicates the output voltage command value, and the vertical axis indicates the number of drive phases. As in the case of the first embodiment, the power conversion circuits 10a, 10b adopting trench type transistors as switching elements for power conversion are referred to as the first phase conversion circuit 10a and the second phase conversion circuit 10b, respectively. The power conversion circuits 10c, 10d adopting planar type transistors as switching elements for power conversion are referred to as the third phase conversion circuit 10c and the fourth phase conversion circuit 10d, respectively. "One phase" on the vertical axis in FIG. 8 means driving solely the first phase conversion circuit 10a. "Two phases" on the vertical axis means that the third phase conversion circuit 10c and the fourth phase conversion circuit 10d are stopped and the first phase conversion circuit 10a and the second phase conversion circuit 10b are driven. "Three phases" on the vertical axis means that the fourth phase conversion circuit 10d is stopped and the first phase conversion circuit 10a to the third phase conversion circuit 10c are driven.

While the output voltage command value is lower than a voltage Vr4 (output threshold value), the controller 17 stops the third phase conversion circuit 10c and the fourth phase conversion circuit 10d, and determines the number of conversion circuits to be driven out of the first phase conversion circuit 10a and the second phase conversion circuit 10b according to the output voltage command value. In a case where the output voltage command value exceeds the voltage Vr4, the controller 17 stops the first phase conversion circuit 10a and the second phase conversion circuit 10b, and determines the number of conversion circuits to be driven out of the third phase conversion circuit 10c and the fourth phase conversion circuit 10d according to the output voltage command value.

Specifically, in a case where the output voltage command value is lower than a voltage Vr2, the controller 17 drives solely the first phase conversion circuit 10a. The controller 17 supplies a driving signal of a predetermined duty ratio to the switching element 3a of the first phase conversion circuit 10a so that the output of the power converter 2 matches the output voltage command value.

In a case where the output voltage command value exceeds the voltage Vr2, the controller 17 drives the second phase conversion circuit 10b in addition to the first phase conversion circuit 10a. The controller 17 supplies a driving signal of a predetermined duty ratio to each of the switching elements 3a, 3b of the first phase conversion circuit 10a and the second phase conversion circuit 10b so that the output voltage of the power converter 2a matches the output voltage command value.

In a case where the output voltage command value exceeds the voltage Vr4, the controller 17 operates the third phase conversion circuit 10c including the planar type transistor in addition to the first phase conversion circuit 10a and the second phase conversion circuit 10b including the trench type transistor to realize the output voltage command value. In a case where the output voltage command value exceeds the voltage Vr6, the controller 17 operates all the power conversion circuits 10a to 10d.

Figure 8:
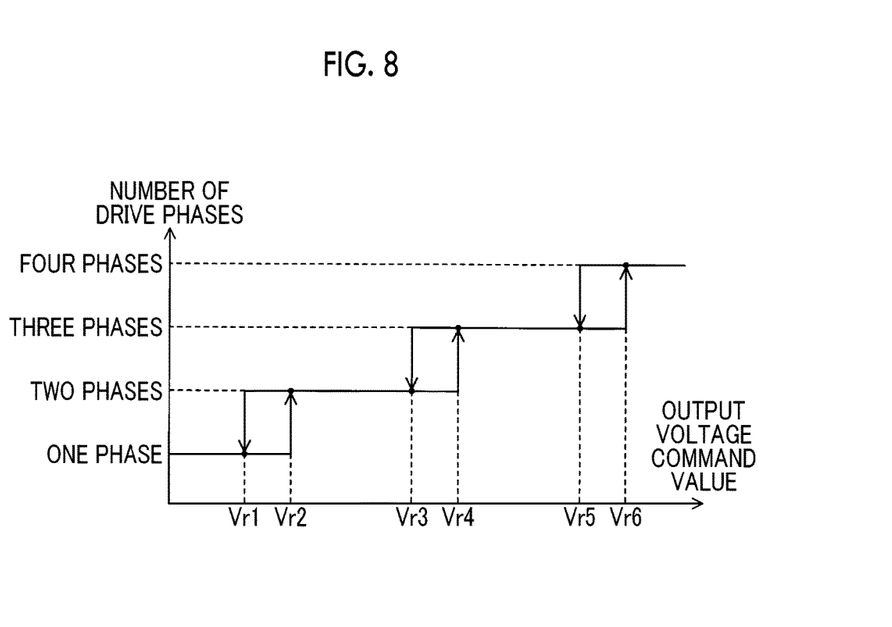
FIG. 8 is a graph illustrating the switching control of the number of drive phases in the power converter of the second embodiment.

The voltages Vr1, Vr3, Vr5 in FIG. 8 are threshold values in the case of reducing the number of drive phases. The reason why the threshold values Vr1, Vr3, Vr5 in the case of reducing the number of drive phases are slightly smaller than the threshold values Vr2, Vr4, Vr6 in the case of increasing the number of drive phases is to prevent hunting that the number of drive phases is frequently switched.

The power converter 2a of the second embodiment also has the same advantages as the power converter 2 of the first embodiment.

Reference Examples

Figure 9:
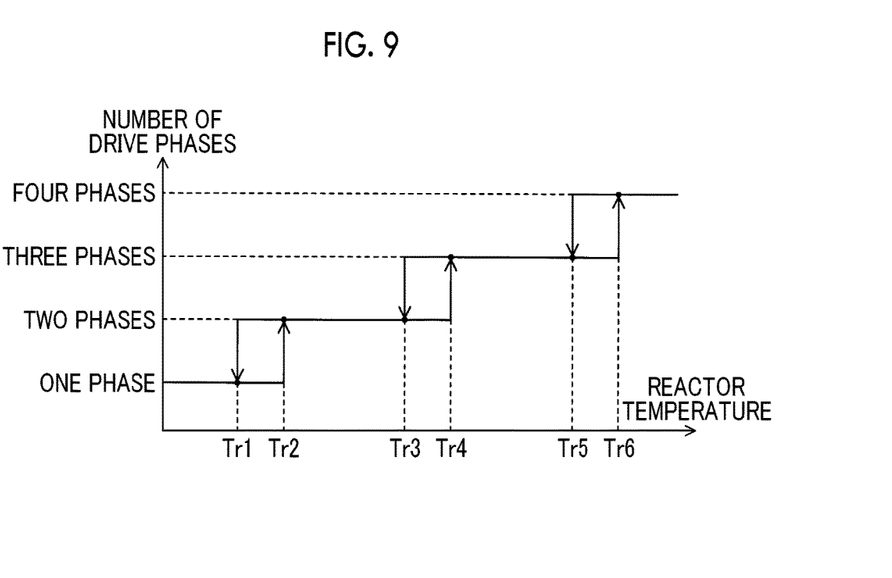
FIG. 9 is a graph illustrating the switching control of the number of drive phases in a reference example.

In order to realize the output current (voltage) command value, the power converter 2 (2a) can disperse the load to the power conversion circuits 10a to 10d. By using the above-described features, it is possible to avoid a situation in which the heat generation amounts of the reactors 5a to 5d are different. The switching control of the number of drive phases in this case will be described with reference to FIG. 9. FIG. 9 can be applied to the power converter 2 shown in FIG. 1, and can also be applied to the power converter 2a shown in FIG. 7.

The controller 17 monitors the temperature of each of the reactors 5a to 5d of the power conversion circuits 10a to 10d. As shown in FIGS. 1 and 7, the temperatures of the reactors 5a to 5d are measured by the temperature sensors 8a to 8d, respectively, and the measurement data is transmitted to the controller 17 (refer to FIGS. 1 and 7). First, the controller 17 operates solely the first phase conversion circuit 10a. In a case where the highest temperature (in this case, the temperature of the reactor 5a) among the temperatures of the reactors 5a to 5d exceeds the temperature T2, the controller 17 operates the second phase conversion circuit 10b. Then, in a case where the highest temperature (in this case, the temperature of the reactor 5a or 5b) among the temperatures of the reactors 5a to 5d exceeds the temperature T4, the controller 17 also operates the third phase conversion circuit 10c. Then, in a case where the highest temperature (in this case, the temperature of the reactor 5a or 5b or 5c) among the temperatures of the reactors 5a to 5d exceeds the temperature T6, the controller 17 also operates the fourth phase conversion circuit 10d. As described above, in a case where the temperature of the reactor exceeds the predetermined temperature threshold values T2, T4, T6, it is possible to prevent the heat generation amount of a specific reactor from increasing by increasing the number of conversion circuits to be operated to distribute the load.

The reason why the threshold values T1, T3, T5 in the case of reducing the number of drive phases are slightly smaller than the threshold values T2, T4, T6 in the case of increasing the number of drive phases in FIG. 9 is to prevent hunting that the number of drive phases is frequently switched.

The selection of the number of drive phases for equalizing the load is not limited to the case based on the temperature of the reactor. For example, the controller may select the number of drive phases according to the maximum temperature of the switching element of each power conversion circuit.

Points to be noted regarding the technique described in the embodiments will be described. The first phase conversion circuit 10a and the second phase conversion circuit 10b each including a trench type transistor as a switching element for power conversion are examples of the first conversion circuit. The third phase conversion circuit 10c and the fourth phase conversion circuit 10d each including a planar type transistor as a switching element for power conversion are examples of the second conversion circuit.

The trench type transistor adopted in the first conversion circuit and the planar type transistor adopted in the second conversion circuit are not particularly limited. However, it is desirable that the trench type transistor adopted in the first conversion circuit and the planar type transistor adopted in the second conversion circuit have the following features. The total loss of the trench type transistor and the total loss of the planar type transistor are almost the same under certain conditions. However, the trench type transistor and the planar type transistor have a loss balance that the trench type transistor is more advantageous than the planar type transistor in the situation of low frequency and low load and the planar type transistor is more advantageous than the trench type transistor in the situation of high frequency and high load. The trench type transistor and the planar type transistor are devices that are not largely different in size.

The output current command value and the output voltage command value are examples of the output command value. The current Ir4 in FIG. 3 and the voltage Vr4 in FIG. 8 are examples of the output threshold value. In a case where the power converter includes "n" power conversion circuits adopting trench type transistors, the output threshold value may be set between the total output of the "n" power conversion circuits and the total output of the "n−1" power conversion circuits.

The power conversion circuits 10a to 10d included in each of the power converters 2, 2a are boost converters. The present disclosure is not limited to the boost converter. The power conversion circuits included in the power converter may be step-down converters or inverters. Alternatively, the power conversion circuits included in the power converter may be bidirectional DC-DC converters. The typical circuit configuration of the bidirectional DC-DC converter is a configuration in which an anti-parallel circuit of a switching element and a diode, instead of a diode, is provided at the position of the diode 6a (6b to 6d) in the circuit shown in FIG. 1. The anti-parallel circuit of the switching element and the diode is provided in a direction in which the cathode is connected to the output terminal positive electrode 13a.

The switching element for power conversion is not limited to the MOSFET, and may be a bipolar transistor (BJT), a hetero field effect transistor (HFET), a high electron mobility transistor (HEMT), a junction FET (JFET), an insulated gate type bipolar transistor (IGBT), a reverse conduction IGBT (RC-IGBT), and a gate turn-off thyristor (GTO). Regardless of the type of switching element adopted, it is sufficient that the principle structures of transistors are the same and one of the transistors is a trench type and the other is a planar type. In a case where the principle structures are the same, the cost of simultaneously developing the trench type element and the planar type element can be suppressed.

Each of the power converters 2, 2a of the embodiments includes two power conversion circuits adopting a trench type transistor and two power conversion circuits adopting a planar type transistor. In the present disclosure, however, one or more power conversion circuits adopting a trench type transistor and one or more power conversion circuits adopting a planar type transistor may be included.

The transistors adopted in the first conversion circuit and the second conversion circuit may be formed of silicon carbide (SiC) or may be formed of silicon. The transistors adopted in the first conversion circuit and the second conversion circuit may be of a type called a wide bandgap semiconductor (SiC, gallium nitride (GaN), gallium oxide (Ga$_2$O$_3$), diamond). In the present disclosure, the type of transistor does not matter.

The present disclosure is suitable for a power converter for electric vehicles (device for converting DC power into motor drive electric power). Electric vehicles operate solely with an output of about 50% or less of the maximum output for about 90% of the total operation period. The techniques of the present embodiments frequently using a trench type transistor having a relatively small on-resistance (steady loss) are suitable for power converters used in the above-described situation. Here, the "electric vehicles" include a hybrid vehicle having both a motor and an engine for traveling and a vehicle having a power generator, such as a fuel cell as a power supply. In addition, the present disclosure is also suitable for power converters used for applications other than vehicles.

While the specific examples of the present disclosure have been described in detail above, these are merely illustrative and do not limit the scope of the claims. The techniques described in the claims include various changes and modifications of the specific examples exemplified above. The technical elements described in this specification or the diagrams exhibit technical usefulness individually or in various combinations, and are not limited to combinations described in the claims at the time of filing. The techniques exemplified in this specification or the diagrams make it possible to achieve a plurality of purposes at the same time, and have technical usefulness by itself achieving one purpose.

What is claimed is:

1. A power converter comprising:
   one or more first conversion circuits configured to use a trench type transistor as a switching element for power conversion;
   one or more second conversion circuits configured to use a planar type transistor as a switching element for power conversion; and
   a controller configured to select a conversion circuit to be operated according to an output command value for the power converter, wherein:
   all the one or more first conversion circuits and all the one or more second conversion circuits are connected in parallel to each other, or all the one or more first conversion circuits and all the one or more second conversion circuits are connected in series to each other; and
   the controller is configured to
   stop all the one or more second conversion circuits and operate at least one of the one or more first conversion circuits while the output command value is lower than a predetermined output threshold value, and
   operate all the one or more first conversion circuits and operate at least one of the one or more second conversion circuits when the output command value exceeds the predetermined output threshold value.

2. The power converter according to claim 1, wherein the controller is configured to set a carrier frequency of a case where all the one or more first conversion circuits and all the one or more second conversion circuits are operated to be higher than a carrier frequency of a case where the second conversion circuit is not operated.

3. The power converter according to claim 2, wherein, when a temperature of the transistor of any one of all the one or more first conversion circuits and all the one or more second conversion circuits exceeds a predetermined second temperature threshold value, the controller is configured to set a carrier frequency to be lower than a carrier frequency before exceeding the second temperature threshold value.

4. The power converter according to claim 1, further comprising:
   a reactor for power conversion; and
   a temperature sensor configured to monitor a temperature of the reactor,
   wherein, when the temperature of the reactor exceeds a predetermined first temperature threshold value, the controller is configured to set a carrier frequency to be higher than a carrier frequency before exceeding the first temperature threshold value.

5. The power converter according to claim 1, further comprising:
   a capacitor; and
   a temperature sensor configured to monitor a temperature of the capacitor,
   wherein, when the temperature of the capacitor exceeds a predetermined first temperature threshold value, the controller is configured to set a carrier frequency to be higher than a carrier frequency before exceeding the first temperature threshold value.

* * * * *